United States Patent [19]

Kinnebrew et al.

[11] 3,916,071

[45] Oct. 28, 1975

[54] CERAMIC SUBSTRATE FOR RECEIVING RESISTIVE FILM AND METHOD OF FORMING CHROMIUM/CHROMIUM OXIDE CERAMIC SUBSTRATE

[75] Inventors: Gerald P. Kinnebrew; James O. Redwanz, both of Dallas; Elmer A. Wolff, Jr., Richardson, all of Tex.

[73] Assignee: Texas Instruments Incorporated, Dallas, Tex.

[22] Filed: Nov. 5, 1973

[21] Appl. No.: 412,938

[52] U.S. Cl. ................ 428/376; 427/103; 428/377; 428/378; 428/381; 428/384; 428/389; 428/398; 428/399; 428/472

[51] Int. Cl.[2] ........................ B44D 1/18; D02G 3/00

[58] Field of Search ............ 117/215, 217; 338/308, 338/300, 302, 314; 252/512, 518; 427/103, 123, 126; 428/376, 377, 378, 381, 384, 389, 398, 399, 472

[56] References Cited

UNITED STATES PATENTS

| | | | |
|---|---|---|---|
| 3,107,179 | 10/1963 | Kohring | 338/308 |
| 3,293,587 | 12/1966 | Robinson | 338/300 |
| 3,368,919 | 2/1968 | Casale et al. | 117/217 |
| 3,380,156 | 4/1968 | Lood et al. | 338/308 |
| 3,404,032 | 10/1968 | Collins | 338/300 |
| 3,406,043 | 10/1968 | Balde | 117/217 |
| 3,564,353 | 2/1971 | Corak et al. | 117/217 |
| 3,607,384 | 9/1971 | Banks | 117/215 |
| 3,805,023 | 4/1974 | Wainer et al. | 117/215 |

*Primary Examiner*—Cameron K. Weiffenbach
*Attorney, Agent, or Firm*—Hal Levine; James Comfort; Gary C. Honeycutt

[57] ABSTRACT

The disclosure relates to a method of forming a resistive film on a substrate formed of a metal having a coating of a ceramic oxide of the metal by the controlled heating and/or application of oxygen to the film producing system. Chromium is heated in a reduced pressure air atmosphere, containing the normal ratio of oxygen found in air, to a temperature at which the chromium will atomize. The chromium, which is electrically conductive and has a positive temperature coefficient of resistance, along with a chromium suboxide which is somewhat electrically conductive and has a negative temperature coefficient of resistance will deposit on ceramic substrates which are being continually rotated within a tumbler or the like within the partially evacuated system. The chromium suboxide along with small amounts of chromium will deposit on the ceramic with the ratio of chromium suboxide to chromium metal continually changing in favor of the metal as the oxygen in the atmosphere is used up. At a more elevated temperature, mainly chromium will deposit as the metal on the ceramic substrate after the oxygen has been substantially depleted. The amount of chromium metal deposited on the substrate is controlled by the temperature to which the chromium is heated as well as the length of time at which the chromium is above the temperature required for deposition thereof onto the ceramic substrate. In accordance with another embodiment, the amount of oxygen in the evacuated area can be controlled from an external source to control the amount of chromium sub-oxide which can be deposited upon the ceramic substrate. Also disclosed is the meta substrate having the ceramic oxide of the metal thereon. Aluminum with an anodized outer surface is specifically set forth. In addition, a flexible ceramic substrate is disclosed for use in the procedure for forming resistive coatings.

8 Claims, 1 Drawing Figure

CERAMIC SUBSTRATE FOR RECEIVING RESISTIVE FILM AND METHOD OF FORMING CHROMIUM/CHROMIUM OXIDE CERAMIC SUBSTRATE

BRIEF SUMMARY OF THE INVENTION

This invention relates to a new ceramic type substrate for use in making resistive devices of the film type as well as to a chromium/chromium oxide or sub-oxide resistive film system and method for use with said substrate or with a flexible ceramic substrate.

BACKGROUND OF THE INVENTION

Film resistors are well known in the art and are utilized because of the ability to provide such resistors with very accurate resistance values as well as with low temperature coefficients of resistance. The best such devices have temperature coefficients of resistance as low as in the range of about +25 to −25 ppm/°C. Such film resistors have normally required the deposition of a combination of nickel and chromium metal upon a ceramic substrate, the amount of each metal being controlled to provide the desired temperature coefficient of resistance. The resistors have been formed by completely coating the ceramic with the resistive coating and then removing some of the resistive coating to form a helix of resistive coating upon the ceramic which provides the resistive element. The thickness and pitch of the helix as well as its length determine the resistance of the final element. Systems of this type, while providing superior results and product, have suffered from the inherent problem of requiring control over two separate metals, namely nickel and chromium. The requirement of such control is relatively costly and, furthermore, control over the nickel itself presents greater problems than that over chromium. A serious problem found in the nickel/chromium system is the difficulty in maintaining stoichiometric amounts of nickel and chromium to obtain the desired temperature coefficient of resistance (TCR). This is a major reason for the inability to consistantly provide resistors having a TCR of about zero with a deviation of less than 10PPM/°C.

The prior art film resistors have also required that the resistive coating be formed on a ceramic substrate. Ceramic substrates have been relatively expensive and have had poor thermal conductivity properties.

DETAILED DESCRIPTION

Figure 1:
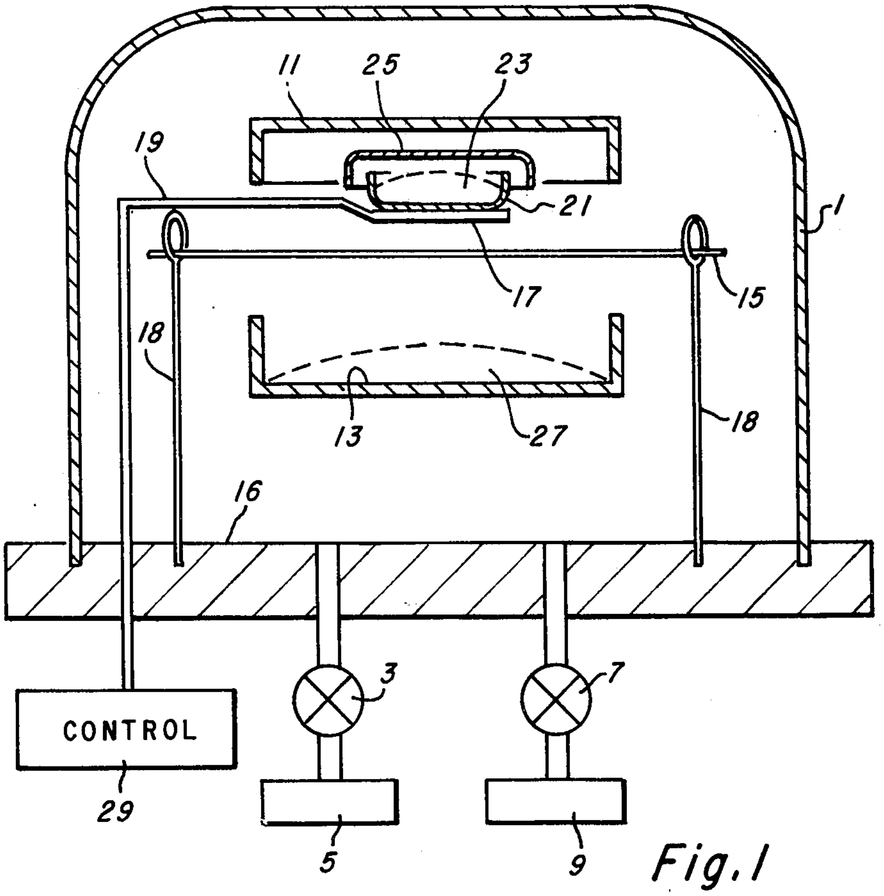

In accordance with the present invention, the above-noted problems of the ceramic substrate are overcome by providing a substrate of a metal, the oxide of which is a ceramic and the surface of the metal being oxidized to provide a ceramic outer surface. Aluminum oxides are the most typical and desirable of the metals having this property. Aluminum has high thermal conductivity relative to ceramic and it is therefore possible to provide resistors using an aluminum/aluminum oxide or anodized aluminum substrate which is either more reliable than the ceramic substrate for equivalent size or which can have the size thereof reduced for the same or equivalent power rating. In addition, a resistor made with an aluminum oxide coated aluminum substrate is more reliable since operating temperature and thermal stress are reduced.

The problems set forth above for the prior art resistive coating are overcome by depositing atomized chromium in an air atmosphere at reduced pressure whereby the oxygen in the air combines with the chromium to form a slightly electrically conductive chromium sub-oxide having a negative temperature coefficient of resistance. The chromium sub-oxide forming on the ceramic substrates, which are being tumbled or rotated within the evacuated atmosphere is controlled by controlling the temperature at which the chromium is being atomized whereby a control is provided over the ratio of chromium sub-oxide formed to that of pure chromium. In addition, the deposition time can also determine the ratio of chromium sub-oxide to chromium. This ratio is a function of both temperature of the chromium and deposition time. The result of this system is that control is required over only one metal, this being chromium, which is also much more easily controlled than is nickel. From this single metal plus oxyen, both positive and negative temperature coefficient resistive material can be deposited in any desired ratio to provide resistors having any desired temperature coefficient of resistance, either positive or negative within wide limits. The use of a one metal system eliminates all problems of stochiometry of the prior art.

In addition to the above, the substrate can be a ceramic flexible tape or a metal substrate having an oxide of the metal at its surface, the oxide being a ceramic material.

It is therefore an object of this invention to provide a ceramic substrate for use in the formation of film resistors which is composed of a metal and an oxide of the metal on its surface, the oxide being a ceramic material.

It is a further object of this invention to provide a substrate for making film resistors which is formed of anodized aluminum over an aluminum core.

It is a yet further object of this invention to provide a resistive device formed by depositing a chromium/-chromium sub-oxide film on a flexible ceramic tape.

It is still a further object of this invention to provide a resistive device which is composed of a combination of chromium and chromium sub-oxide deposited over a substrate wherein the outer surface of the substrate is a ceramic oxide of the metal of the core of the substrate.

It is a yet further object of this invention to provide film resistive materials which are comprised of a film of chromium and chromium sub-oxide deposited on a substrate which is composed of a core of aluminum having an outer surface of anodized aluminum upon which the resistive material is deposited.

The above objects, and still further objects of the invention will immediately become apparent to those skilled in the art after consideration of the following preferred embodiments thereof, which are provided by way of example and not by way of limitation, wherein:

The FIGURE is a schematic diagram of a system for performing and method of forming film resistors in accordance with the present invention.

Referring now to the FIGURE, there is shown an evacuated chamber 1 which is shown in the form of a bell jar. A pair of valves 3 and 7 extending into the chamber 1 are shown, the valve 3 being coupled to a vacuum device 5 for evacuating the chamber 1 to the desired pressure. The valve 7 is coupled to a source of gas 9 which can be either oxygen or a combination of oxygen with an inert gas for directing a predetermined measured amount of oxygen into the chamber 1 in a manner which will be described hereinbelow. The valve 7 and source of gas 9 can be omitted. Within the chamber 1 is a revolving tumbler 11 having an interior surface 13 which is formed of quartz or the tumbler 11 can be formed of quartz in its entirety. The tumbler rotates on the axis 15 which is secured to the base 16 of the chamber 1 in holding means 18 shown schematically. The tumbler 11 is open along the axis 15 to allow oxygen within the chamber 1 to enter into the tumbler for formation of chromium sub-oxides which will be later described. Within the tumbler 11 is a heater 17 which may be a tungsten heater or the like and which is externally controlled by the input current leads 19 thereto from a control unit 29. The heater 17 has the property that almost simultaneously with the removal of power therefrom, the chromium will stop atomizing due to the very large amount of energy required to heat the heater to incandescense. A ceramic boat 21 is positioned over the heater 17 and chromium metal power 23 is positioned within the boat. An evaporation shield 25 is positioned over the boat 21 to direct vaporized or atomized chromium downwardly within the tumbler during the coating process. Ceramic cores or substrates on which deposition of chromium and chromium sub-oxide is to take place are deposited in the lower portion 27 of the tumbler and are tumbled around in that region as the tumbler 11 is rotated around the axis 15.

According to the first embodiment of the invention, the valve 7 and oxygen source 9 are not utilized. Instead, normal air which is about 20% oxygen and about 80% nitrogen fills the chamber 1, the chamber then being evacuated to a desired pressure, this being for example, in the vicinity of $10^{-6}$ torr. The amount of oxygen remaining in the chamber 1 is determined by the remaining pressure as can be easily calculated. The pressure within the chamber is therefore controlled prior to operation to provide an accurately measured amount of oxygen in the chamber.

Prior to this evacuation, ceramic cylinders have been placed in the region 27 of the tumbler and chromium of approximately 325 mesh has been placed in the region 23 within the boat 21. The heater 17 is then heated up to a sufficient temperature to allow vaporization of the chromium 23 while the tumbler 11 is rotating. At low temperatures of vaporization of the chromium, the chromium will form in vaporized or atomized state with the oxygen within the chamber and form a chromium sub-oxide within the chamber and form a chromium sub-oxide which is a slightly electrically conductive chromium oxide having a negative temperature coefficient of resistance and this chromium oxide along with a small amount of chromium is deposited on the ceramic substrates which are being tumbled in the region 27. As the temperature of the chromium is increased and as the available oxygen is depleted, the ratio of sub-oxide to the chromium metal being deposited changes in favor of chromium, the chromium having a positive temperature coefficient of resistance and being electrically conductive. It can be seen that control of the length of time that the heater 17 is causing atomization of the chromium and control of the temperature to which such chromium is raised will determine the quantity and ratio of chromium and chromium sub-oxide deposited. It should be understood that the quantity of chromium and chromium sub-oxide deposited on the substrates is a function of both the quantity of oxygen available, the temperature to which the chromium 23 is heated and the length of the heating cycle.

The temperatures to which the chamber should be heated has not been accurately determined and will vary based upon conditions. The conditions must be determined on a case by case basis on the basis of experimental data which has been found to be fully reproducible. It is clear that the chromium must be heated to the evaporation or atomization temperature wherein it will deposit on the substrates.

In a test experiment, the following results were obtained: Using in each case an initial current to the heater 17 of 270 amperes and raising this substantially linearly to 500 amperes over about a 5½ minute period will further heating at 500 amperes, the following was observed:

| Cycle | Time to heat from 270 to 500a. | | Time heating at 500a. | Ohmic Value ohms | TCR Value |
|---|---|---|---|---|---|
| A | 5 min. | 35 sec. | 10 sec. | 1000 | −265 PPM/°C |
| B | 5 min. | 20 sec. | 10 sec. | 400 | −248 PPM/°C |
| C | 5 min. | 30 sec. | 10 sec. | 200 | −218 PPM/°C |
| D | 5 min. | 35 sec. | 1 min. 30 sec. | 23.7 | 30 PPM/°C |

In the above results, cycle B was deposited over A, C over B and D over C. It can be seen that when the oxygen was depleted at the higher temperature and heating continued the resistance of the film decreased substantially and the temperature coefficient of resistance changed from fairly high negative to positive. This shows that primarily chromium was deposited during the 1 minute 30 second heating at 500 amperes in cycle D and indicates the control over TCR which is available.

In a further experiment it was noted that some deposition occurred at about 335 amperes so a test was run at 350 amperes for 17 minutes. It was noted that all samples had highly negative TCRs which indicated that substantially only chromium sub-oxide was being deposited and that temperature and that even higher temperatures were required to deposit chromium metal, even after the available oxygen was depleted. This also indicates the high degree of control available over TCR by the method of this invention.

It is readily apparent that several layers of any type can be repeated, one atop the other, each layer have a predetermined ratio of chromium to chromium oxide, to provide the final desired conditions.

In accordance with a second embodiment, rather than utilizing the ceramic cores which are deposited in the bottom of the tumbler, rectilinear ceramic members can be utilized and strapped to the inner surface of the quartz tumbler. In this way, only the outer surface, that is, the surface facing the interior of the tumbler will have resistive material deposited thereon. By suitable masking, these surfaces can have all kinds of resistive patterns deposited thereon including plural resistors on one substrate.

In accordance with another embodiment of the invention, the chamber 1 can be substantially completely evacuated by means of the valve 3 and vacuum puller 5. The chamber can then be filled with a measured amount of oxygen from the tank 9 via the valve 7 or the oxygen can be mi ed with an inert gas if desered. In this way, the amount of oxygen within the chamber 1 as well as the pressure of the atmosphere within the chamber 1 can be accurately controlled to control the amount of sub-oxide deposition under the conditions discussed herein above.

In accordance with another embodiment of the invention, the ceramic cores, or retilinear substrates, can be formed by providing cylinders or retangular solids formed of aluminum or other metals which are capable of forming ceramic oxides of the metals. The metal is then oxidized or, in the case of aluminum, anodized to provide a metal core with a ceramic metal oxide surface. Since the metal oxide surface is in fact a ceramic, this core with oxide coated thereon can be utilized to replace the cores or rectilinear members described above. Products formed utilizing cores and rectilinear members of this type have improved properties in that the thermal conductivity of aluminum is much greater than that of ceramic and therefore the size of a resistor or resistive element made therewith of equivalent resistance to that made with a ceramic can be substantially smaller. An anodized aluminum substrate as described above can be coated with a chromium/chromium suboxide resistive coating in the manner described above with respect to the FIGURE to provide highly accurate low temperture coefficient of resistance low cost resistors or resistive networks.

As a further embodiment, the well-known flexible ceramic tapes can be utilized as the substrate with the resistive material being deposited thereon. The flexible ceramic tape can be continuous, laminated, stamped or formed. In the case of the flexible ceramic tape, masks or the like can be placed over the tape and the resistive material then deposited onto the ceramic material to provide resistive networks of any form desired, so long as a mask can be made to accommodate the desired resistance network. The tape can be scribed prior to firing to provide stress points which can be snapped apart.

It can be seen that there is provided a method and system for forming resistors and resistive networks which are relatively inexpensive as compared with prior art devices of the same type and which are capable of greater control and therefore greater accuracy and reliability of the end product.

Though the invention has been described with respect to specific preferred embodiments thereof, many variations and modifications thereof will immediately become apparent to those skilled in the art. It is therefore the intention that the appended claims be interpreted as broadly as possible in view of the prior art to include all such variations and modifications.

What is claimed is:

1. A resistive device which comprises:

a. a metal base, the oxide of said metal being a ceramic material;

b. a coating of the oxide of said metal on said metal; and c. a resistive film comprising chromium and chromium oxide on said coating.

2. A resistive device as set forth in claim 1 wherein said resistive film comprises plural layers, each layer having a different ratio of chromium to chromium oxide.

3. A resistive device as set forth in claim 1 wherein said base is cylindrical in shape and said resistive film is in the form of a helix on said coating.

4. A resistive device as set forth in claim 3 wherein said resistive film comprises plural layers, each layer having a different ratio of chromium to chromium oxide.

5. A resistive device as set forth in claim 1 wherein said metal is aluminum and said oxide is aluminum oxide.

6. A resistive device as set forth in claim 5 wherein said resistive film comprises plural layers, each layer having a different ratio of chromium to chromium oxide.

7. A resistive device as set forth in claim 5 wherein said base is cylindrical in shape and said resistive film is in the form of a helix on said coating.

8. A resistive device as set forth in claim 7 having plural resistive layers wherein each of said layers has a different chromium to chromium oxide ratio.

* * * * *